(12) United States Patent
Akram et al.

(10) Patent No.: US 7,464,119 B1
(45) Date of Patent: Dec. 9, 2008

(54) SYSTEM AND METHOD OF MEASURING THE RELIABILITY OF A SOFTWARE APPLICATION

(75) Inventors: Abdul G. Akram, Lee's Summit, MO (US); George W. Hoff, Lee's Summit, MO (US); Jerry F. Matson, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 468 days.

(21) Appl. No.: 11/191,282

(22) Filed: Jul. 28, 2005

(51) Int. Cl.
 *G06F 17/30* (2006.01)
(52) U.S. Cl. .............................. 707/202; 714/1; 714/38
(58) Field of Classification Search ........................ None
 See application file for complete search history.

(56) References Cited

U.S. PATENT DOCUMENTS

| | | | |
|---|---|---|---|
| 6,611,773 B2 * | 8/2003 | Przydatek et al. ............. | 702/62 |
| 6,938,007 B1 * | 8/2005 | Iulianello et al. .............. | 705/34 |
| 2003/0187967 A1 * | 10/2003 | Walsh et al. ................. | 709/223 |
| 2004/0010441 A1 * | 1/2004 | Nandigama et al. ........... | 705/10 |
| 2004/0153835 A1 * | 8/2004 | Song et al. .................... | 714/38 |

OTHER PUBLICATIONS

Gokhale et al. "A Time/Structure Based Software Reliability Model", Annals of Software Engineering, vol. 8, Nos. 1-4, Feb. 1999, p. 85-121.*

Software Composition Technologies, Inc., Function Point FAQ, Jun. 25, 1997, 30 pgs.

Carnegie Mellon University, The Software Engineering Institute (SEI), Function Point Analysis, Software Technology Roadmap, Jan. 9, 2004, 4 pgs.

Akram, Abdul G., et al., "Productivity Measurement and Management Tool," Filing Date—Jun. 14, 2004, U.S. Appl. No. 10/867,074, Specification (29 pgs.), Drawings (4 sheets).

* cited by examiner

*Primary Examiner*—Charles Rones
*Assistant Examiner*—Yuk Ting Choi

(57) ABSTRACT

A computer automated system for measuring software reliability is provided. The system comprises a data store including mean-time-between-failure and mean-time-to-repair metrics for applications and an analysis component. The analysis component determines a reliability index for an application and generates a report associating the reliability index with the application. The reliability index is determined based on dividing the mean-time-between-failure of the application by the mean-time-to-repair of the application. An embodiment of the computer automated system further includes a maintenance financial index that is used to evaluate the development plan, where the maintenance financial index is based on the product of the reliability index multiplied by a delivery rate metric. The delivery rate metric is proportional to a software size metric and inversely proportional to a software development effort metric.

17 Claims, 3 Drawing Sheets

SYSTEM AND METHOD OF MEASURING THE RELIABILITY OF A SOFTWARE APPLICATION

CROSS-REFERENCE TO RELATED APPLICATIONS

This application includes subject matter related to U.S. patent application Ser. No. 10/867,074, entitled "Productivity Measurement and Management Tool," filed Jun. 14, 2004, by Abdul G. Akram, et al, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software, and more particularly, but not by way of limitation, to a system and method for measuring the reliability of software.

BACKGROUND OF THE INVENTION

A number of factors are involved in the quality of computer programs, computer applications, and/or computer software. Some of these factors include correctness, reliability, efficiency, usability, maintainability, testability, flexibility, portability, re-usability, and interoperability. Correctness may be defined as the extent to which the subject software complies with specifications and user objectives for the software. Reliability may be defined as the extent to which the software is expected to perform its intended function. Efficiency may be defined as the amount of computing resources the software consumes while executing. Usability may be defined relative to how much effort is required to learn, operate, prepare input, and prepare output. Maintainability may be defined by the effort required to locate and resolve operational issues, for example bugs or crashes. Testability may be defined by the effort required to test the software. Flexibility may be defined by the effort required to modify the software to add functionality. Portability may be defined by the effort required to install the software on a different execution platform and bring it into service. Re-usability may be defined by the extent to which software can be used in other applications. Interoperability may be defined by the effort required to interface one software system with another software system.

SUMMARY OF THE INVENTION

A computer automated system for measuring software reliability is provided. The system comprises a data store including mean-time-between-failure and mean-time-to-repair metrics for applications and an analysis component. The analysis component determines a reliability index for an application and generates a report associating the reliability index with the application. The reliability index is determined based on dividing the mean-time-between-failure of the application by the mean-time-to-repair of the application. An embodiment of the computer automated system further includes a maintenance financial index that is used to evaluate the development plan, where the maintenance financial index is based on the product of the reliability index multiplied by a delivery rate metric. The delivery rate metric is proportional to a software size metric and inversely proportional to a software development effort metric.

A method of maintenance and productivity management is provided. The method comprises determining a reliability index of an application, the reliability index proportional to a mean-time-between-failure of the application and inversely proportional to a mean-time-to-repair of the application. The method also comprises evaluating the performance of a development team based on the reliability index.

A computer automated system for measuring application delivery efficiency is also provided. The computer automated system comprises an analysis component operable to determine a maintenance financial index of an application based on dividing a first product by a second product, the first product based on multiplying a mean-time-between-failure by a size of the application, and the second product based on multiplying a mean-time-to-repair of the application by a development effort of the application. The analysis component is also operable to generate a report associating the maintenance financial index with the application, wherein the development effort, the mean-time-between-failure, and the mean-time-to-repair are based on statistics reported on the application.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Measurements of work products and/or work processes, also referred to as metrics, may be used to evaluate completed projects or delivered products. A completed project, for example, may be a data mining application that has been completed, tested, and brought into service. A delivered product, for example, may be a wireless handset that has been designed, manufactured, and shipped to distribution centers and/or retail outlets for sale. Metrics may also be used to compare between alternative courses of action. Metrics may be used to define a goal for a project, for example a project to be completed by an outsourcing company. A plurality of factors may contribute to the success of a project, and identifying a metric that represents several factors concurrently is useful. This disclosure describes a reliability index (RI) metric that is proportional to a mean-time-between-failure (MTBF) of a product and inversely proportional to a mean-time-to-repair (MTTR) of the product. The larger the value of the reliability index, the higher the quality of the product. A delivery rate (DR) metric is also disclosed that represents the efficiency of delivering a work product and is proportional to the size of the work product and inversely proportional to the effort consumed in delivering the work product. Again, the larger the value of the delivery rate metric, the higher the productivity or delivery rate for the subject product.

This disclosure further describes a maintenance financial index (MFI) that combines the reliability index metric with the delivery rate metric, thereby joining an indication of quality of the product with an indication of productivity or efficiency. The maintenance financial index metric is proportional to the product of the reliability index and to the delivery rate. The maintenance financial index may be used to specify expectations of a work team, either an in-house work team or an outsourced work team, and/or to evaluate the success of a completed work effort.

Figure 1:
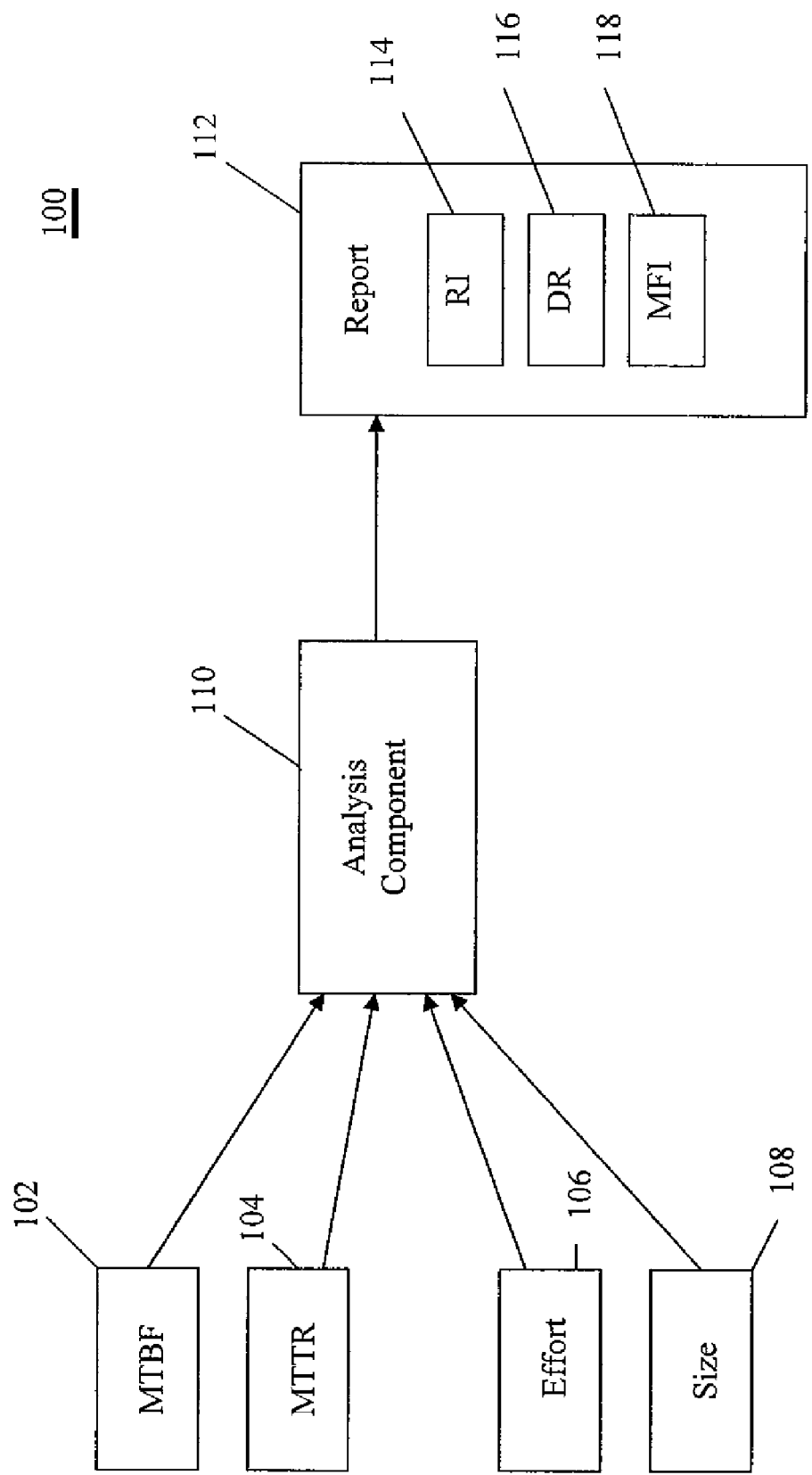
FIG. 1 is a block diagram illustrating a tool for determining a plurality of application metrics according to an embodiment of the disclosure.

Turning now to FIG. 1 a block diagram of a system 100 that may be used to determine the maintenance financial index for one or more products is depicted. The system 100 maintains a plurality of basic metrics on each of a plurality of products, for example a computer program or application, that are collected for each product over the life of the product. The basic metrics include a mean-time-between-failure 102, a mean-time-to-repair 104, an effort 106, and a size 108. In an embodiment, the system 100 may maintain basic metrics on other items such as electronic components, electronic assemblies, mechanical components, mechanical assemblies, and/or other components and assemblies.

In an embodiment, the length of time in hours of uninterrupted service of each product between failures of that product is accumulated and the mean-time-between-failure 102 metric is calculated as an average of time between failure for each product. The failure events which terminate uninterrupted service intervals may be defined to be failures that result in a failure report or repair ticket being generated. In other embodiments, other criteria for determining that a failure event has occurred may be employed. A failure severity level may be employed in determining that a failure has occurred. In an embodiment, the length of time in minutes consumed repairing each product is recorded for each failure event and the mean-time-to-repair 104 metric is calculated as an average of repair times for each product.

In an embodiment, the effort 106 metric expended in developing or otherwise producing the products is accumulated. The effort 106 metric may be quantified as a number of labor hours expended to deliver the product. In an embodiment, the effort 106 may be quantified by accumulating labor hours multiplied by a labor cost to take account of different labor wage rates within the product or application development labor pool.

The size 108 metric of the products may be determined differently depending on the product. The size 108 metric may be evaluated based on a physical volume of the product, on a physical weight of the product, or some other dimension of the product. For software products or computer applications, the size 108 metric may be evaluated using function point analysis, a business operation point analysis, and/or a lines-of-code count, or other techniques known to those of skill in the art.

Function point analysis is a standardized means of determining the size 108 metric of a software application that involves identifying and counting functionalities or function points to be delivered by an application based on a requirements document or other statement of deliverable functionality. The more function points to be delivered, the greater the size 108 metric. The employment of function point analysis to determine the size 108 metric may have some disadvantages. For example, determining the size 108 metric based on function point analysis may be a highly subjective and manually intensive process. Personnel may have to analyze documents and perform the function point analysis manually, a labor intensive and time consuming activity. Additionally, the criteria for identifying function points may be ambiguous. It sometimes happens that different analysts working on the same proposed project functionality may arrive at different function point counts. U.S. patent application Ser. No. 10/867,074, entitled "Productivity Measurement and Management Tool," filed Jun. 14, 2004, by Abdul G. Akram, et al, discloses an embodiment that is directed to a tool that can automatically generate a level of effort estimate based on objective criteria that may be used in determining the size 108 metric. The tool allows organizations to readily and accurately identify all the functionality required by a new application or project to be developed by an outsourced supplier. The tool also identifies any of the functionality that has already been developed, such as in a previous project, to accurately assess development costs and avoid being charged by an outsourcing provider for developing functionality that may have already been developed.

A business operation point (BOP) is defined to be a communication or an interaction described in an analysis model, where the communication is between any two applications or, within an application, between any two components. A modeled communication request is a business operation point, and a modeled communication response to the request is another business operation point. The modeled communication may be a method call or an application programming interface (API) call invoked by one application or component. The modeled communication may be a return from a method call or an API call, such as a response, provided by one application or component. Since the business operation points are defined to be part of the analysis model, counting business operation points may be performed prior to the implementation phase of the project and may be used to determine the size 108 metric.

The system 100 includes an analysis component 110 that has access to the mean-time-between-failure 102, the mean-time-to-repair 104, the effort 106, and the size 108 metrics. The analysis component 110 may calculate one or more intermediate metrics based on the mean-time-between-failure 102, the mean-time-to-repair 104, the effort 106, and the size 108 metrics. In an embodiment, the analysis component 110 calculates a reliability index (RI) based on the mean-time-between-failure 102 and the mean-time-to-repair 104. The reliability index may be calculated as:

$$RI = MTBF/MTTR$$

where the mean-time-between-failure (MTBF) 102 metric is represented in hours and the mean-time-to-repair (MTTR) 104 metric is represented in minutes. In another embodiment, however, the mean-time-between-failure 102 metric and the mean-time-to-repair 104 metric may be represented in different time units or in some specific time increment or time interval. The reliability index grows larger as the mean-time-between-failure increases. The reliability index also grows larger as the mean-time-to-repair grows smaller. The reliability index is proportional to MTBF and inversely proportional to MTTR. In an embodiment, the reliability index may be scaled by dividing by a scaling factor to make the magnitude of the number more manageable. For example, a reliability index having a value that is generally in the range from 0 to 10 may be more easily included in reports and/or other communications than a value in the range from 0 to 100,000. In an embodiment, where MTBF is represented in hours and MTTR is represented in minutes, the scaling factor may have a value in a range from about two to about fifty. In another embodiment, a scaling factor may be arbitrarily selected to provide a number whose size is preferable or manageable. More ideally, the scaling factor may use a logarithmic representation of the value of the reliability index to allow for the reduction in the magnitude scale as well as for easier initial comprehension.

A reliability index above a threshold high value may not be useful or meaningful. In an embodiment, where the reliability index is calculated as:

$$RI = MTBF/(10 \times MTTR)$$

Where MTBF is represented in hours and MTTR is represented in minutes, the maximum value of the reliability index may be limited to a value in a range from about twenty to about one hundred. The minimum value may be about 0.1 or in a range of from about 0.001 to about 0.5. In other embodiments, other scaling factors, other time units, and other maximum values may be used. The reliability index metric provides a figure-of-merit for evaluating the quality of a product or software application. In particular, the reliability index metric may be useful for comparing the quality or reliability of two or more similar products or software applications.

In an embodiment, the analysis component 110 calculates a delivery rate (DR) metric based on the size 108 and the effort 106 metrics as:

$$DR = size/effort$$

The units may vary depending on the method by which the basic metrics, the effort 106 and the size 108 metrics, are determined. The delivery rate metric may be scaled as appropriate to produce a manageable number. The delivery rate metric provides a figure-of-merit for evaluating the efficiency of producing or developing a product or software application. In particular, the delivery rate metric may be useful for comparing the development efficiency of two or more similar products or software applications.

In an embodiment, the analysis component 110 calculates a maintenance financial index (MFI) that is proportional to both the reliability index and the delivery rate. In an embodiment, the maintenance financial index may be determined as:

$$MFI = RI \times DR$$

The scaling of the reliability index and the delivery index provides scaling of the maintenance financial index. In the preferred embodiment, a scaling factor is applied to the reliability index and delivery index before the maintenance financial index is calculated. In other embodiments, the scaling factor may be multiplied times the product of the reliability index times the delivery rate to obtain the maintenance financial index. The maintenance financial index provides a figure-of-merit for evaluating the quality and/or reliability of a product in combination with the efficiency of product development. In particular, the maintenance financial index may be useful for comparing between two or more different developments or substantially similar products. The maintenance financial index may be useful for specifying expectations to an outsourcing provider or to an internal development group. For example, management may challenge an internal development group to achieve a five percent increase in the maintenance financial index for a second product development cycle relative to a first product development cycle. Alternatively, management may provide a bonus incentive to an outsourcing provider for increasing and/or a penalty for reducing the maintenance financial index of products produced in a later development cycle versus an earlier development cycle. In the past, focusing on quality alone or delivery rate alone has been observed to lead to sacrificing the alternate parameter undesirably. Depending on past or recent experience, a scaling factor could be applied individually to one or the other of the reliability index (RI) or delivery rate (DR) to increase the focus on that result to achieve a desired balance. In an embodiment, the maintenance financial index may be represented by logarithmic values to make the magnitude of the number more manageable.

The maintenance financial index may also be employed for performing engineering trade studies. For example, a project may be analyzed for cost sensitivity to reliability index changes. It may be that reducing a project requirement to achieve a reliability index of. 50 down to a reliability index of 45 may reduce project costs by 30 percent. If this reliability index of 45 is still acceptable to management, substantial savings may be realized, thereby increasing the maintenance financial index.

In an embodiment, the analysis component 110 may produce a report 112 containing various combinations of a reliability index 114 metric, a delivery rate 116 metric, and a maintenance financial index 118 metric for each of a plurality of products.

Figure 2:
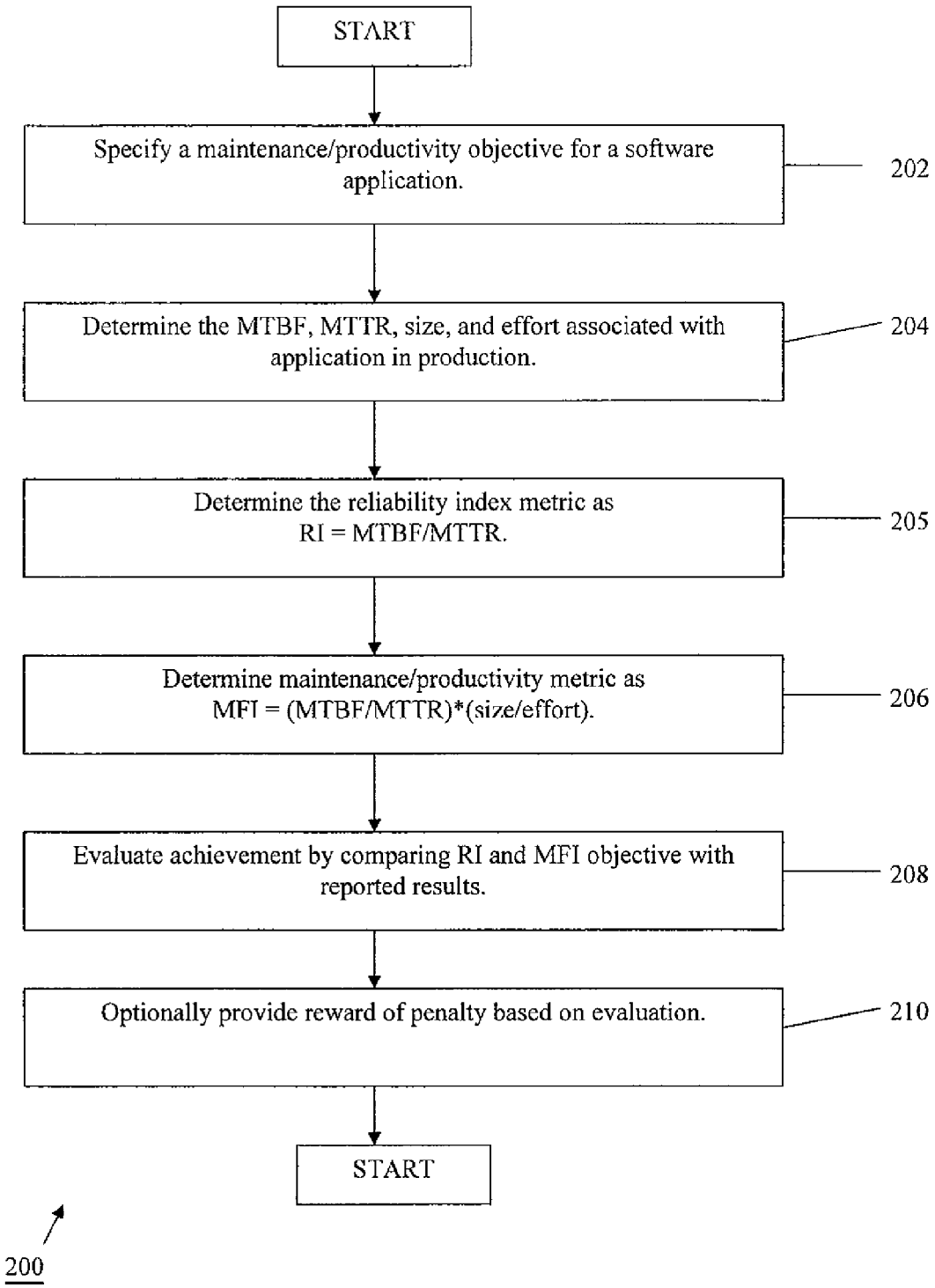
FIG. 2 is a flow diagram illustrating a method of determining a plurality of application metrics according to an embodiment of the disclosure.

Turning now to FIG. 2, a flow diagram 200 depicts a method of determining and using the reliability index 114, the delivery rate 116, and the maintenance financial index 118 metrics. The method begins at block 202 where a maintenance/productivity metric objective is specified for a software application. In an embodiment, the maintenance/productivity metric may include the reliability index (RI) 114 and the maintenance financial index (MFI) 118 metric. In an embodiment, specifying the maintenance/productivity metric objective may include specifying a performance bonus for exceeding the maintenance/productivity metric objective and/or specifying a performance penalty for failing to achieve the maintenance/productivity metric objective. For example, in an embodiment, an outsourcer may be offered a fixed award for exceeding the maintenance/productivity metric objective by fifteen percent or more and a fixed deduction for falling short of the maintenance/productivity metric objective by more than fifteen percent. In other embodiments, other reward and penalty arrangements may be employed, including a proportional scale including maximum reward and penalty amounts. The objective may also be referred to as a target. While in FIG. 2 a development of a software application is depicted and described, in another embodiment it is contemplated that these metrics and this process may be applied to other kinds of projects and development efforts.

The method 200 proceeds to block 204 where the mean-time-between-failure 102, the mean-time-to-repair 104, the effort 106, and the size 108 metrics are determined for the application in production. The effort 106 and the size 108 metrics may be determined at or shortly after completion time. The mean-time-between-failure 102 and the mean-time-to-repair 104 metrics may be determined from logistical analysis, based on the rolling-up of mean-time-between-failure 102 and mean-time-to-repair metrics of component parts. Alternatively, the mean-time-between-failure 102 and the mean-time-to-repair 104 metrics may be determined from maintenance records accrued over a representative period of service, for example over a year of service.

The method 200 proceeds to block 205 where the reliability index (RI) is determined for the application in production as RI=MTBF/MTTR.

The method 200 proceeds to block 206 where the maintenance/productivity metric, for example the maintenance financial index (MFI) 118, is determined based on the mean-time-between-failure 102, the mean-time-to-repair 104, the effort 106, and the size 108 metrics of the product. The maintenance/productivity metric is proportional to the mean-time-between-failure 102 and the size 108 metrics and is inversely proportional to the mean-time-to-repair 104 and the effort 106 metrics. In an embodiment, scaling factors may be applied to calculating the maintenance/productivity metric directly or to individual base metrics.

The method 200 proceeds to block 208 where the maintenance/productivity metric achieved by the product development is compared to the maintenance/productivity metric objective specified in block 202, for example comparing the target reliability index to the actual reliability index and the target maintenance financial index to the actual maintenance financial index. This activity may involve determining a percentage of variance, either plus or minus, from the maintenance/productivity metric objective.

The method 200 proceeds to block 210 where the percentage variance from the maintenance/productivity metric objective is optionally used to determine a performance bonus or to levy a performance penalty. In other embodiments, the outsourcer may be paid a variable rate, such as per hour for software development, adjusted based on the quality as determined, for example, by the maintenance/productivity metric objective. Thus, the outsource supplier/developer has an economic incentive to continually monitor and improve the quality of software and systems provided by the outsourcer. The method 200 then exits.

Figure 3:
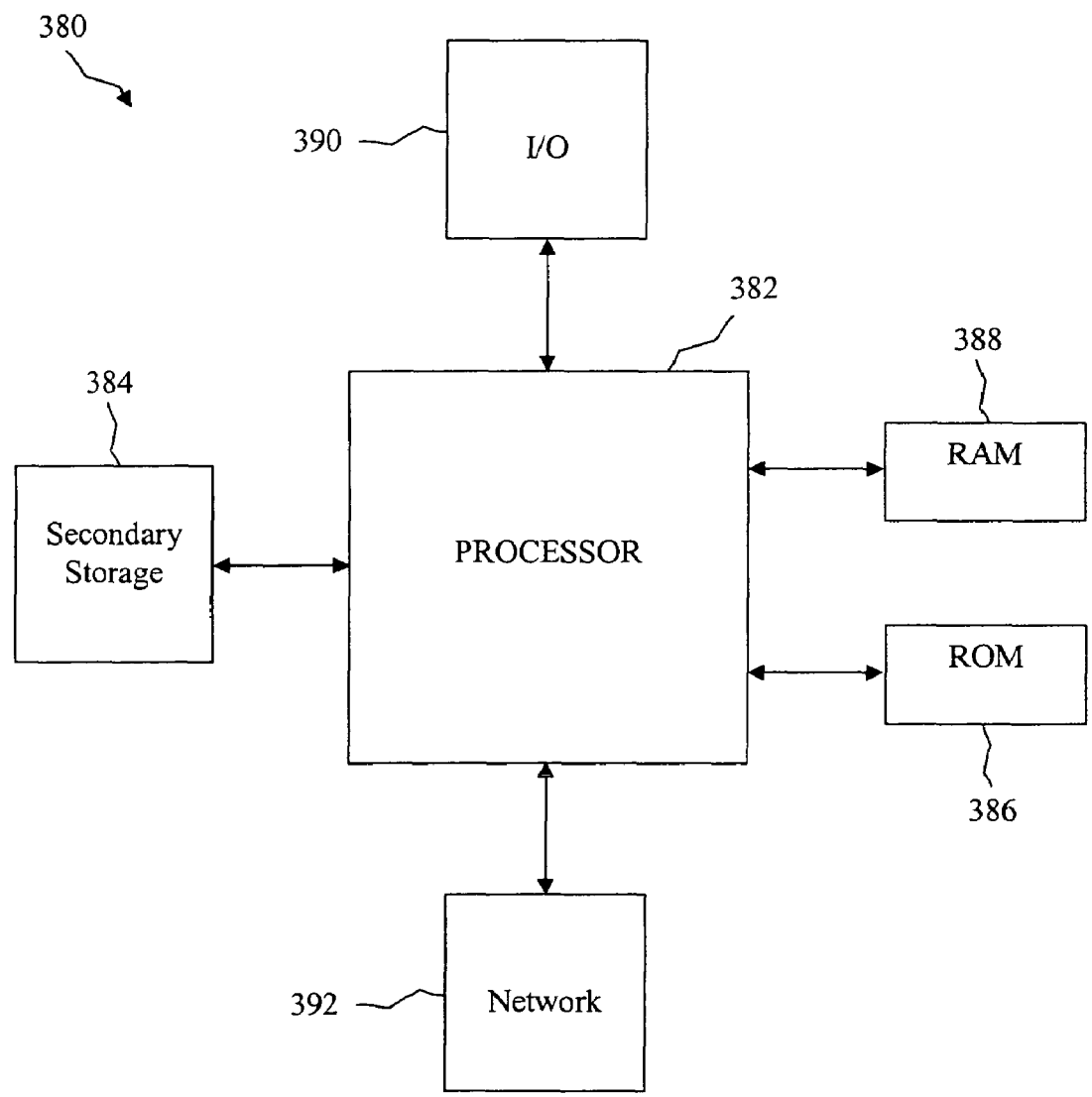
FIG. 3 illustrates an exemplary general purpose computer system suitable for implementing the several embodiments of the disclosure.

The system 100 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer automated system for measuring software reliability, comprising:
   at least one processor;
   a data store including mean time between failure and mean time to repair information on a plurality of software;
   an analysis component stored on a computer readable storage medium and configured to be executed by the at least one processor, the analysis component configured to determine a reliability index to measure reliability for one of the software and to generate a report associating the reliability index with the software, the reliability index determined by dividing the mean time between failure of the software by mean time to repair of the software; and
   the analysis component further configured to determine maintenance financial index by the product of the reliability index multiplied by a delivery rate metric, the delivery rate metric proportional to a software size metric and inversely proportional to a software development effort metric, and the reliability index used in combination with the maintenance financial index to evaluate a development plan.

2. The computer automated system of claim 1, wherein the mean time between failure is measured in hours and the mean time to repair is measured in minutes.

3. The computer automated system of claim 2, wherein the reliability index is calculated by dividing the mean time between failure by a product of the mean time to repair and a scaling factor K, where the value of K is in the range of about 2 to 50.

4. The computer automated system of claim 3, wherein the reliability index is caped at a maximum value and wherein the maximum value is in the range from about 20 to about 100.

5. The computer automated system of claim 1, wherein the reliability index is capped at a maximum value.

6. The computer automated system of claim 1, wherein a scaling factor is applied to the maintenance financial index.

7. The computer automated system of claim 1, wherein the analysis component comprises, at least in part, one or more equations associated with a spreadsheet program.

8. A computer implemented method of maintenance and productivity management, comprising:
   storing in a data store a mean time between failure and a mean time to repair information on a plurality of software;
   determining a reliability index of an application by dividing the mean time between failure of the application by the mean time to repair of the application;
   determining a maintenance financial index by the product of the reliability index multiplied by a delivery rate metric, the delivery rate metric proportional to an application size metric and inversely proportional to an application development effort metric;
   generating a report associating the reliability index with the application; and
   evaluating the performance of a development team based on the reliability index and the development team achieving a stipulated maintenance financial index.

9. The computer implemented method of claim 8, wherein the reliability index is limited to a maximum value.

10. The computer implemented method of claim 8, further including granting a contract to based, at least in part, on an application achieving a stipulated reliability index.

11. The computer implemented method of claim 10, wherein the contract provides an incentive for exceeding a stipulated reliability index.

12. A computer automated system for measuring application delivery efficiency, comprising:
   at least one processor;
   a data store including mean time between failure and mean time to repair information on a plurality of software;
   an analysis component stored on a computer readable storage medium and configured to be executed by the at least one processor, the analysis component configured to determine a maintenance financial index of an application by dividing a first product by a second product, the first product determined by multiplying the mean time between failure by a size of the application, and the second product determined by multiplying the mean time to repair of the application by a development effort of the application, the analysis component further configured to generate a report associating the maintenance financial index with the application, wherein the development effort, the mean time between failure, and the mean time to repair are based on statistics reported on the application.

13. The computer automated system for measuring application delivery efficiency of claim 12, wherein the analysis component is a spreadsheet including an equation to calculate the maintenance financial index.

14. The computer automated system for measuring application delivery efficiency of claim 12, wherein the maintenance financial index is limited to a maximum value.

15. The computer automated system for measuring application delivery of claim 12, wherein the mean time between failure statistics are based on generation of a failure report.

16. The computer automated system for measuring application delivery of claim 12, wherein the size metric is based on a factor selected from the group consisting of a function point analysis, a business operation point analysis, and a lines of code count.

17. The computer automated system for measuring application delivery of claim 12, wherein a scaling factor is applied to the maintenance financial index.

* * * * *